United States Patent [19]

Hinckley

[11] 4,019,754
[45] Apr. 26, 1977

[54] VEHICLE CONNECTING DEVICE
[76] Inventor: John A. Hinckley, 26th St. and 72nd Ave., Lawton, Mich. 49065
[22] Filed: Jan. 22, 1973
[21] Appl. No.: 325,540
[52] U.S. Cl. .................. 280/456 R; 280/446 R
[51] Int. Cl.² ...................................... B62D 53/00
[58] Field of Search .... 280/446, 447, 456, 461 RA, 280/497, 499; 180/14; 172/677

[56] References Cited
UNITED STATES PATENTS

| | | | |
|---|---|---|---|
| 393,358 | 11/1888 | Clever | 254/109 |
| 1,297,154 | 3/1919 | Hammond et al. | 280/408 |
| 2,025,820 | 12/1935 | Miller | 280/447 |
| 2,393,358 | 1/1946 | Ferguson | 280/461 R |
| 2,414,248 | 1/1947 | Townsend | 280/447 |
| 2,444,944 | 7/1948 | Minter | 280/456 R |
| 2,628,107 | 2/1953 | Schlairet | 280/418 |
| 2,653,823 | 9/1953 | Wilson | 280/456 A |
| 2,653,824 | 9/1953 | Frevik | 280/456 A |
| 2,750,863 | 6/1956 | Miller et al. | 280/456 A X |
| 3,003,790 | 10/1961 | Brown | 280/456 A X |
| 3,066,952 | 12/1962 | Price | 280/460 A X |
| 3,105,705 | 10/1963 | Richard | 280/461 R |
| 3,295,611 | 1/1967 | Bunting et al. | 280/460 A X |
| 3,787,068 | 1/1974 | Miller | 280/446 R |
| 3,790,191 | 2/1974 | Gallatin | 280/476 R X |

FOREIGN PATENTS OR APPLICATIONS

166,982   3/1950   Austria ............................ 280/492

*Primary Examiner*—Robert R. Song
*Assistant Examiner*—R. Schrecengost
*Attorney, Agent, or Firm*—Woodard, Weikart, Emhardt & Naughton

[57] ABSTRACT

Connecting devices are disclosed for connecting a second vehicle to a motor vehicle. Certain of these devices attach at or near the rear of a motor vehicle and cause at least certain portions of yawing or pitching rotation of the second vehicle with respect to the motor vehicle to be about axes which come close to or intersect the center of mass of the motor vehicle. Thus the second vehicle will remain stable behind the motor vehicle when towed.

10 Claims, 18 Drawing Figures

VEHICLE CONNECTING DEVICE

BACKGROUND OF THE INVENTION

Field of the Invention

The invention relates to connection of a second vehicle to a first vehicle.

Description of the Prior Art

It has long been known to connect one vehicle to another. One type of connection of vehicles uses a ball and socket joint placed between the two vehicles. Such a joint allows for 3° of rotational movement between the two vehicles: pitch, roll, and yaw. It has been recognized that stability if improved by attaching the towed vehicle (trailer) to a point forward of the extreme rear of the towing vehicle (motor vehicle). However, with automobiles, convenience in connecting and disconnecting the towed vehicle from the motor vehicle has lead to the almost universal attachment of trailer hitches to the rear of the automobiles. Fifth wheels used to connect semitrailers to tractors are usually placed over or slightly in front of the rear wheels of the tractor to provide a measure of stability in towing.

When connecting a trailer to an automobile or certain other motor vehicles, the space above or in front of the rear wheel is often unavailable or inconvenient for attachment of a trailer. Goodwin in U.S. Pat. No. 2,397,001 provides a tongue on a trailer which extends under a car to a ball and socket joint located just behind the rear axle. Carroll in U.S. Pat. No. 3,383,119 provides a long elevated tongue on a trailer which attaches to a ball and socket joint detachably mounted to the roof of a car. While these combinations provide an improved measure of stability, they tend to make attachment of the trailer inconvenient and require a specially designed trailer.

With conventional trailer hitches having a ball mounted at the rear of the towing vehicles, the amount of tongue weight applied to the rear of the car is critical in providing a semblance of stability. The requirement of a particular tongue wwight puts considerable constraints on the manner of loading thw towed vehicles.

Figure 1:
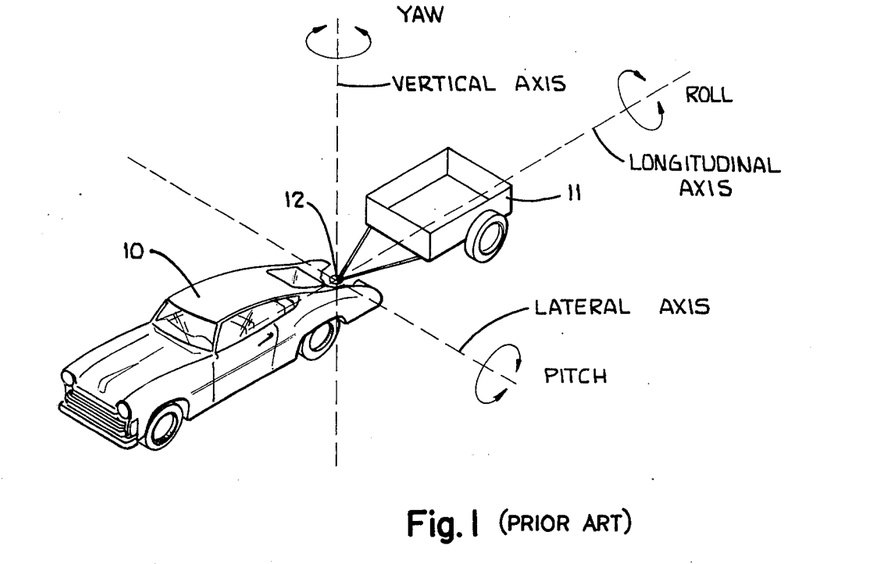
FIG. 1 is an isometric view of a conventional car and trailer of the prior art, connected conventionally with a ball and socket joint.

The prior art and the terminology used herein can best be understood with reference to FIGS. 1 and 2a–d. FIG. 1 is an isometric view of a car 10 connected to a two-wheeled trailer 11 with a conventional ball and socket joint 12 mounted at the rear of the car. The ball and socket joint 12 allows for rotation of the trailer 11 with respect to the car about the lateral, longitudinal and vertical axes. The rotational movements about these axes are called pitch, roll, and yaw, respectively. It is essential that all three types of rotational movements are permitted when a car tows a trailer.

Figure 2A:
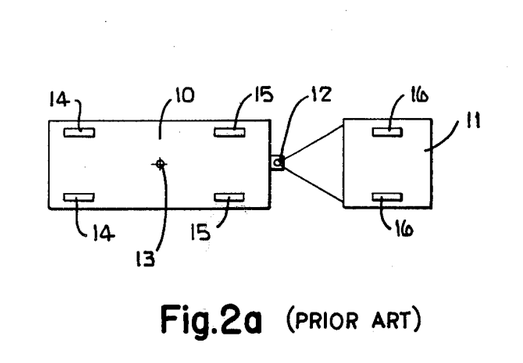
FIG. 2a illustrates diagrammatically a top view of the connected car and trailer of FIG. 1
Figure 2B:
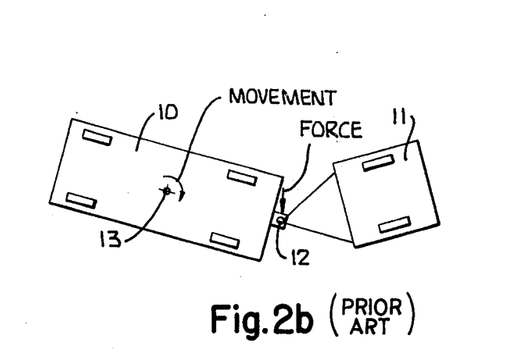
FIG. 2b illustrates a top view of the car and trailer of FIG. 2a after a lateral force has been applied to the ball and socket joint which connects the trailer to the car.

FIG. 2a illustrates diagrammatically a top view of the car 10 and trailer 11 of FIG. 1. The car has two front wheels 14 adjustable for steering, two rear wheels 15 and a center of mass 13 at its center. The trailer 11 has two wheels 16. FIG. 2b illustrates the results which occur when a lateral force is applied to the ball and socket joint 12 while the vehicles are moving. The car 10 is caused to yaw as shown, and this rotation changes the direction of travel of the car and thus results in instability.

Figure 2C:
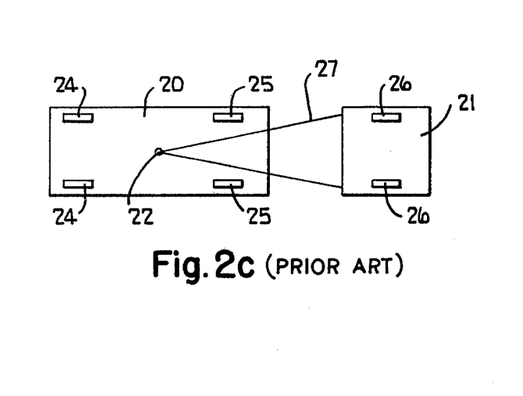
FIG. 2c illustrates diagrammatically a top view of another prior art car and trailer combination and FIG. 2d illustrates a top view of the car and trailer of FIG. 2c after a lateral force has been applied to the ball and socket joint which connects the trailer to the car.
Figure 2D:
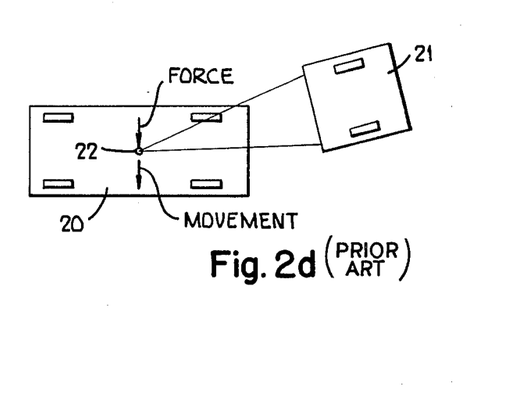

FIG. 2c illustrates diagrammatically a top view of a car 20 and trailer 21. The car 20 has two front wheels 24 adjustable for steering, two rear wheels 25, and a ball and socket joint 22 located directly above the center of mass of the car 20. The trailer 21 has two wheels 26 and a long tongue 27 which extends over the car 20 to the ball and socket joint 22. FIG. 2d illustrates the results which occur (neglecting roll) when a lateral force is applied to the ball and socket joint 22 while the vehicles are moving. It can be observed that all of the yawing of the car 20 is eliminated by this approach. However, the long tongue 27 is expensive and difficult to attach. Some cars (especially convertibles) do not have roofs which are structurally sufficient for such attachment. Furthermore, attachment above the roof introduces a new instability because lateral forces applied to the joint 22 tend to cause the car to roll. Longitudinal forces tend to cause the car to pitch. In effect, placement of a ball and socket joint on the roof of a car instead of at the rear of the car replaces roll stability with yaw stability.

In FIG. 1 where roll stability is present, only rotational movement above an axis (longitudinal) which approximately intersects the center of mass of the car 10 has negligible effect on the car. In FIG. 2c, where yaw stability is present, only rotational movement about an axis (vertical) which approximately intersects the center of mass of the car 20 has negligible effect on the car.

Summary of the Invention

The invention relates to the combination of a motor vehicle, a second vehicle and connecting means which connects the two vehicles and which causes at least a portion of the rotational movement between the two vehicles to be about an axis which does not intersect said connecting means.

The combination of this invention provides for convenience in attaching a second vehicle to a motor vehicle while also affording stability in towing. When the second vehicle is a conventional two-wheeled trailer, stringent requirements for balanced loading are eliminated with this invention and the amount of tongue weight is essentially irrelevant to stability.

The invention also relates to a second vehicle rotatably connected to a motor vehicle and in which rotation between the vehicles changes from being about an axis near the center of mass of the motor vehicle to being about an axis near the rear of the motor vehicle depending upon the relative angle between the motor vehicle and second vehicle. Thus at slow speeds, sharp turns are made rather easily, while at high speeds, stability is excellent.

BRIEF DESCRIPTION OF THE DRAWINGS

FIG. 3b illustrates a modified form of the invention of FIG. 3a.

DESCRIPTION OF THE PREFERRED EMBODIMENT

Figure 3A:
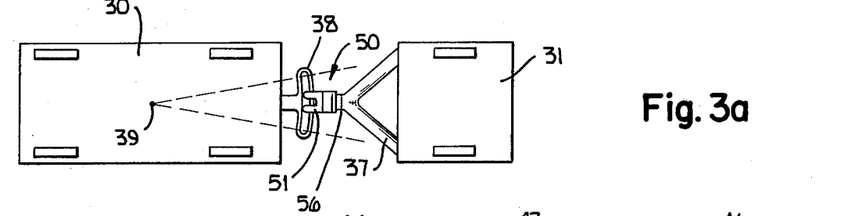
FIG. 3a illustrates diagrammatically a top view of a car and trailer combination embodying the invention.

Referring in particular to FIG. 3a there is illustrated a car 30 with a center of mass 39, the car 30 being connected to a two-wheeled trailer 31 having a tongue 37 by a connecting device 50. The connecting device 50 serves to rotatably connect the trailer 31 to the car 30. The connecting device 50 includes a curved guide 38 which curves about an axis which comes close to or intersects the center of mass 39 of the car. In FIG. 3a the radius of curvature of the curved guide 38 is constant. Due to the curved guide 38 and follower 51, yawing of the trailer is caused to be about a vertical axis which comes close to or intersects the center of mass of the car. The vertical axis about which the trailer yaws does not intersect the connecting means at all; nor does it even come near to the connecting means.

Figure 3B:
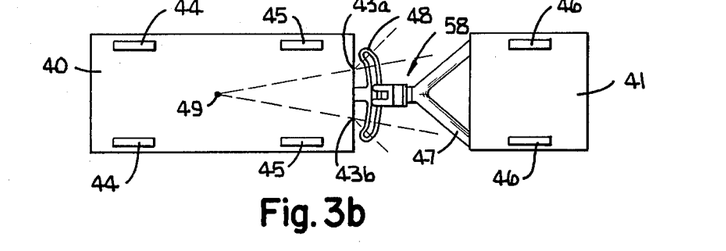

In FIG. 3b there is illustrated a car 40 having two front wheels 44 adjustable for steering, two rear wheels 45, and a center of mass 49. A trailer 41 having two wheels 46 and a tongue 47 connects to the car 40 through a connecting device 58 which is shown in more detail in isometric view in FIG. 4. Connecting means 58 includes a curved gude 48 which has a space 54 in which pins 52 and 53 of follower 51 ride. As is illustrated in FIG. 3b, the center portion of the curved guide 48 curves about an axis which comes close to or intersects the center of mass 49 of the car 40. However, the two end portions of the curved guide 48 curve about axes 43a and 43b which do not comme close to or intersect the center of mass of the car, but which are located at the rear of the car and thus come close to the connecting means 58 itself. Thus when the trailer 41 is directly behind the car 40, small yawing movements will be about a vertical axis which comes close to or intersects the center of mass of the car, while when the trailer is at a sharp angle with respect to the car, yawing will be about a vertical axes which comes close to the connecting means itself.

Figure 4:
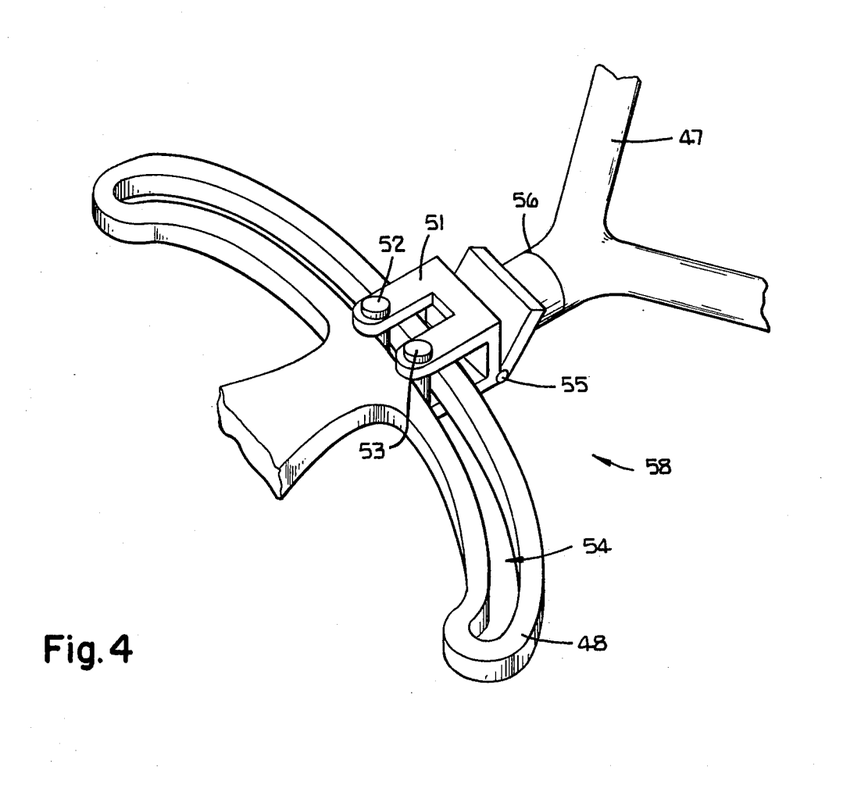
FIG. 4 is an isometric view of the invention illustrated in FIG. 3b.

Pitching and rolling movements of the trailer 41 with respect to the car 40 are accommodated in connecting device 58 by a hinge joint 55 and a rotory joint 56. The connecting device 50 is similarly constructed. The attachment of the curved guide 48 to the car 40 can be accomplished by any quick release type of connector (not shown) if desired.

Figure 5A:
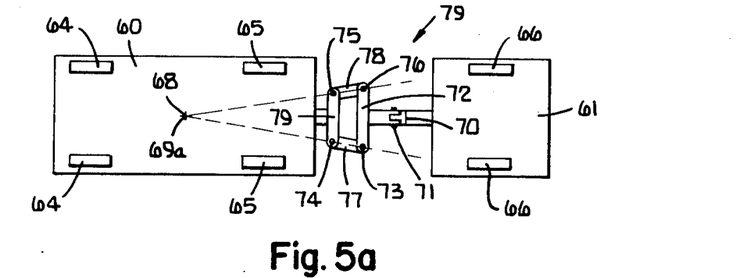
FIGS. 5a, 5b, and 5c illustrate diagrammatically top views of a car and trailer combination which utilizes an alternative embodiment of the invention, the various views illustrating the respective positions of the trailer and car when turning.

Referring in particular to FIG. 5a there is illustrated a car and trailer combination which utilizes an alternative embodiment of the invention. The car 60 has a center of mass 68, front wheels 64 adjustable for steering and rear wheels 65. A trailer 61 having two wheels 66 connects to the car 60 through a connecting device 79.

Connecting device 79 includes a first element 79 which is rigidly connected to the car 60. Two connecting elements 77 and 78 are each pivotally connected to element 79 to provide only 1° of rotational freedom and with the axes of rotation 74 and 75 being parallel and not collinear. Elements 77 and 78 also pivotally connect to an element 72 and have only 1° of rotational freedom in such pivotal connections. The axes of rotation 73 and 76 of elements 77 and 78 with respect to element 72 are parallel and not collinear.

Figure 5B:
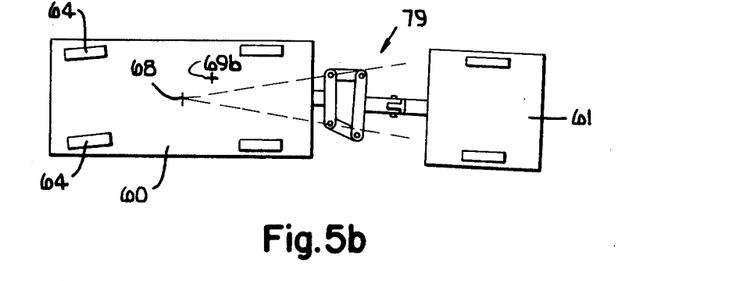

Element 72 then connects to trailer 61 through a hinge joint 71 to accommodate pitching between the trailer and the car and a rotary joint 70 to accommodated rolling between the trailer and the car. As illustrated in FIG. 5a, small movements of the trailer 61 from its position directly behind car 60 in a lateral direction will cause yawing which will occur about a vertical axis 69a which exactly intersects the center of mass 68 of the car. FIG. 5b illustrates the trailer slightly displaced from its lateral position directly behind the car as shown in FIG. 5a. In FIG. 5b, small amounts of yawing will still occur about a vertical axis 69b which is very near the center of mass 68 of the car.

Figure 5C:
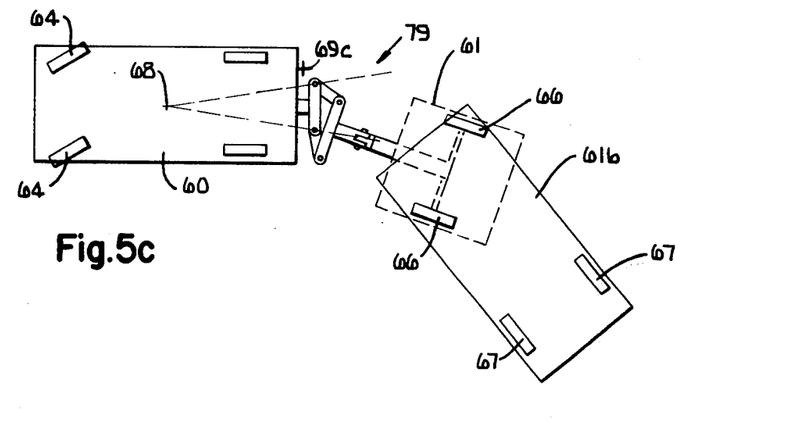

However, when the car 60 turns sharply as illustrated in FIG. 5c, the connecting device 79 causes the trailer 61 to rotate about an axis 69c which is near the rear of the car 60. A solid-line configuration of a four-wheeled trailer 61b having front wheels 66 and rear wheels 67 is contrasted with a dotted-line configuration of a two-wheeled trailer 61 to illustrate that the invention is equally appropriate with two or four wheeled trailers.

Figure 6:
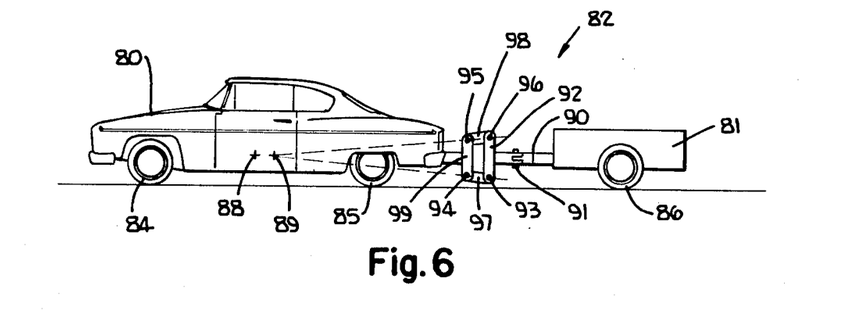
FIG. 6 illustrates a side view of a car and trailer combination which utilizes an embodiment of the invention which is similar to the embodiments of FIGS. 5a, 5b, and 5c except that the connecting device is oriented in a vertical rather than in a horizontal plane.

Referring to FIG. 6 there is illustrated a car 80 and trailer 81 combination which utilizes a connecting device 82 which is essentially identical to the connecting device 79 of FIG. 5a, 5b and 5c. The difference is merely in that the connecting device is rotated 90° in order to cause pitching of the trailer 81 with respect to the car 80 to be about a lateral axis 89 which comes close to the center of mass 88 of the car 80.

The car 80 has a center of mass 88, front wheels 84 adjustable for steering and rear wheels 85. A trailer 81 having two wheels 86 connects to the car 80 through a connecting device 82.

Connecting device 82 includes a first element 99 which is rigidly connected to the car 80. Two connecting elements 97 and 98 are each pivotally connected to element 99 to provide only 1° of rotational freedom and with the axes of rotation 94 and 95 being parallel and not collinear. Elements 97 and 98 also pivotally connect to an element 92 and have only 1° of rotational freedom in such pivotal connections. The axes of rotaton 93 and 96 of elements 97 and 98 with respect to element 92 are parallel and not collinear.

Element 92 then connects to trailer 81 through a hinge joint 91 to accommodate yawing between the trailer and the car and a rotary joint 90 to accommodate rolling between the trailer and the car. In FIG. 6 small movement of the trailer 61 from its position directly behind car 60 in a vertical direction will cause pitching which will occur about a lateral axis 89 which comes close to the center of mass 88 of the car. This will result in elimination of virtually all pitching instability in towing.

Figure 7:
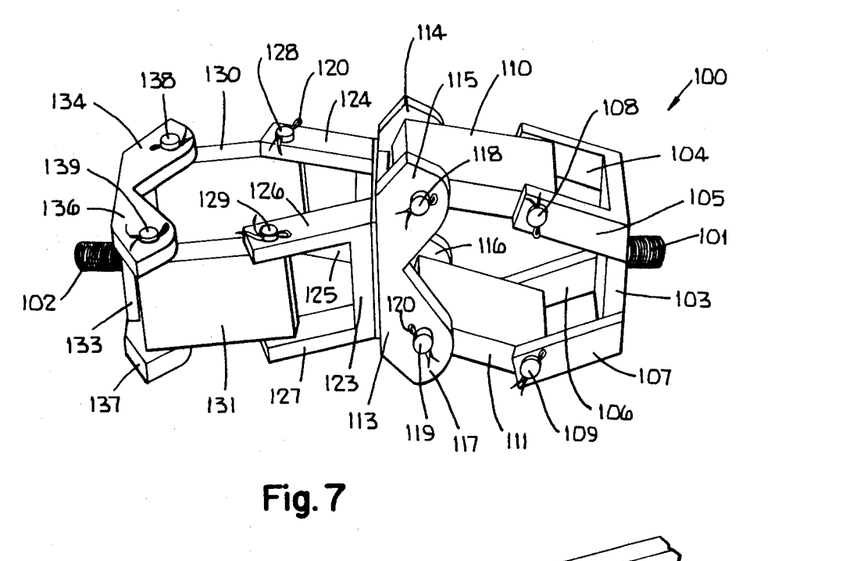
FIG. 7 illustrates a connecting device which incorporates inventive features of the connecting devices of both the invention of FIGS. 5a, 5b and 5c and the invention of FIG. 6.
Figure 8:
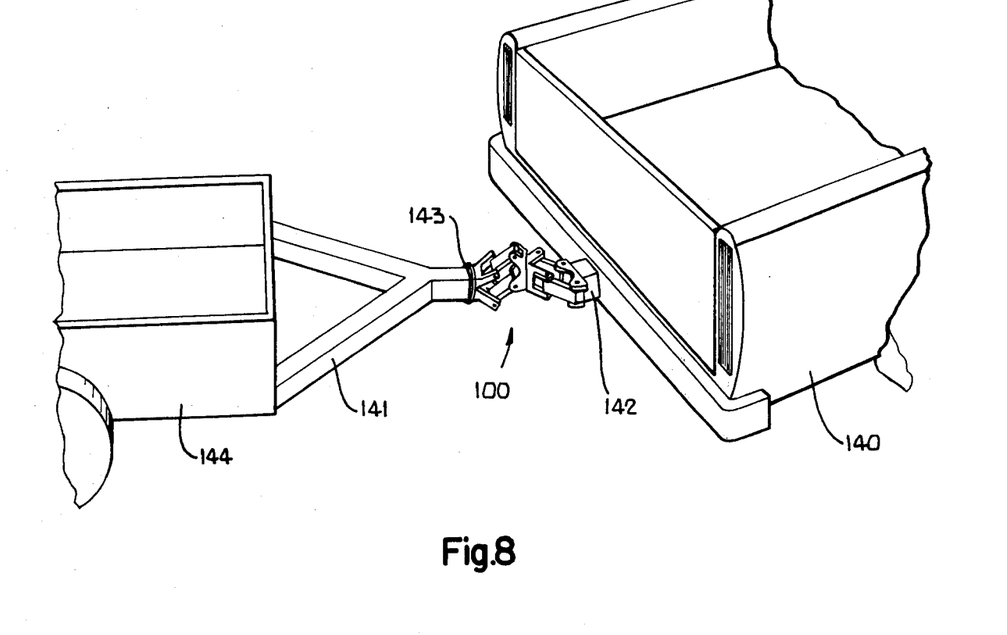
FIG. 8 illustrates a trailer attached to a truck with the connecting device of FIG. 7.

Referring in particular to FIG. 7 there is illustrated a connecting device 100 which is a combination of the inventive features of the connecting devices of FIGS. 5a, 5b and 5c and of FIG. 6. Use of connecting device 100 thus results in both pitching stability and yawing stability. FIG. 8 illustrates the connecting device of FIG. 7 connecting a two-wheeled trailer 144 to a four wheeled truck 140. A threaded stud 101 is used to connect the connecting device 102 to a rotary joint 143 (to provide roll stability) on the tongue 141 of the two-wheeled trailer 144. Stud 101 connects to the center of a bracket 103 having four arms 104, 105, 106 and 107. A pin through the ends of arms 104 and 105 serves to pivotally connect a connecting bar 110 to the arms 104 and 105 with 1° of rotational freedom. Similarly a pin 109 through the ends of arms 106 and 107 serve to pivotally connect connecting bar 111 to the arms 106 and 107 with 1° of rotational freedom.

Connecting bars 110 and 111 also each pivotally connect with 1° of freedom to a bracket 113. Connecting bar 110 pivotally connects to bracket 113 by a pin 118 through arms 114 and 115 of bracket 113 and connecting bar 111 pivotally connects to bracket 113 by a pin 119 through arms 116 and 117 of bracket 113. Cotter pins 120 serve to hold pins 108, 109, 118, 119, 138, 139, 128, and 129 in place. Pins 108, 109, 118 and 119 are of equal size and are all oriented parallel to one another. The distance between pins 108 and 118 is equal to the distance between pins 109 and 119; however, the distance between pins 108 and 109 is greater than the distance between pins 118 and 119. This difference in distance has the effect of causing pitching of the trailer 144 with respect to the truck 140 to be about a lateral axis which comes close to the center of gravity of the truck 140 for a slight vertical movement of the trailer from its position directly behind the truck.

The second half of the connecting device 100, including brackets 123 and 133, is identical to the first half of the connecting means 100 including bracket 103 and bracket 113. Bracket 123 is welded to bracket 113 in a position such that pins 128 and 129 would be parallel to a line perpendicular to the axial centers of pins 118 and 119. A connecting bar 130 is pivotally connected to arms 124 and 125 of bracket 123 through pin 128 and a connecting bar 131 is pivotally connected to arms 126 and 127 of bracket 123 through pin 129. Connecting bar 130 is also pivotally connected to arms 134 and 135 (not shown) of bracket 133 through connecting pin 138 and connecting bar 131 is also connected to arms 136 and 137 of bracket 133 through pin 139. The axes of rotation of the connecting bars with respect to the brackets will of course be collinear with the axial center of the pins.

Pins 128, 129, 138 and 139 are all parallel to each other and are all of the same size. The distance between pins 128 and 138 is equal to the distance between pins 129 and 139, however, the distance between pins 128 and 129 is greater than the distance between pins 128 and 139. A threaded stud 102 is affixed to the center of bracket 133 for attachment of the connecting device 100 to the rear of truck 140 at a connecting bracket 142. With the combination illustrated in FIG. 8, when the trailer 144 is directly behind the truck 140, any small rotational movement of the trailer with respect to the truck will be about an axis which comes close to or intersects the center of mass of the truck. This is true whether the rotational movement is yaw, pitch or roll. Of course when there is a large angle between the trailer and the truck, some of the rotational movements of the trailer with respect to the truck will be about axes which come close to or intersect the connecting device 100.

Figure 9:
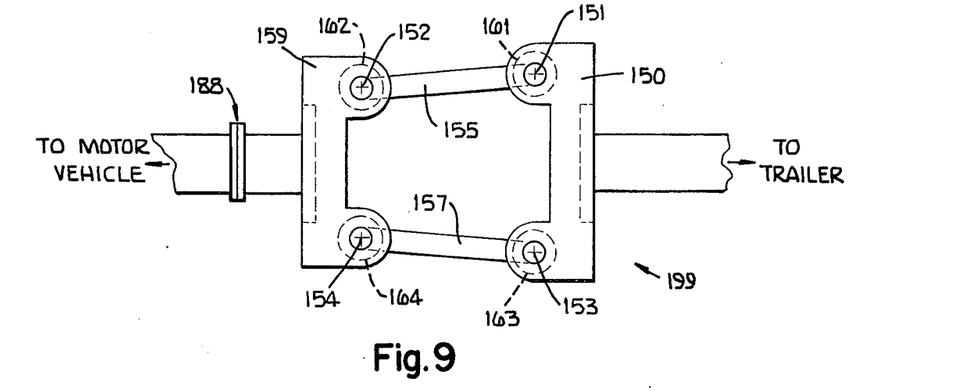
FIG. 9 illustrates a top view of another connecting device which incorporates inventive features of the connecting devices of both the invention of FIGS. 5a, 5b, and 5c and the invention of FIG. 6, and which may be used in place of other connecting devices of the invention.
Figure 10:
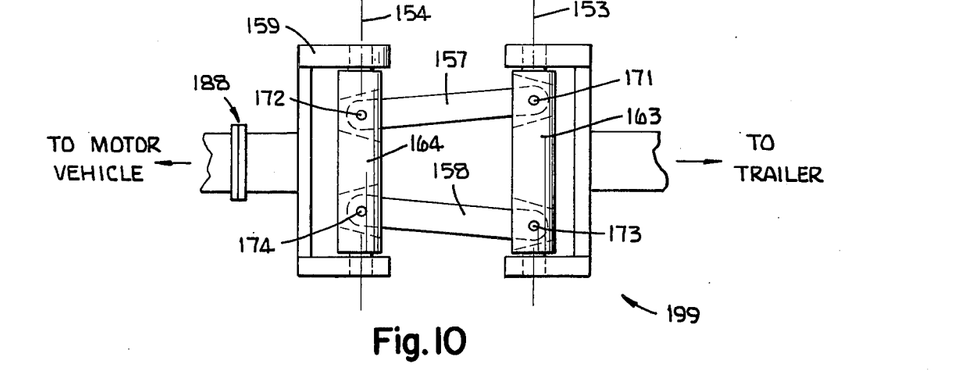
FIG. 10 is a side view of the connecting device of FIG. 9.
Figure 11:
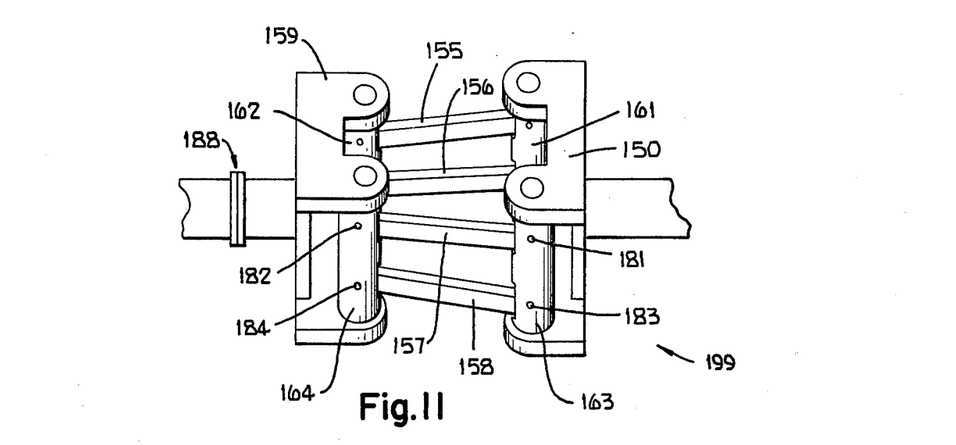
FIG. 11 is a perspective view of the connecting device of FIG. 9.

FIGS. 9, 10 and 11 illustrate another connecting device incorporating inventive features of the connecting devices of FIGS. 5a, 5b and 5c and of FIG. 6 and which may be used in place of other connecting devices of the invention. There is illustrate a bracket 150 which connects to a trailer and which serves as one element of a pivoting device which includes pivoting member 161 and 163 each having 1° of rotational freedom with respect to the bracket 150 and having parallel axes of rotation 151 and 153, respectively. Similarly bracket 159 serves as one element of a pivoting device which includes pivoting members 162 and 164 which rotate about parallel axes 152 and 154 respectively with 1° of rotational freedom. Bracket 159 connects through rotary connector 188 to a motor vehicle, the rotary connector 188 accommodating rolling of the trailer with respect to the motor vehicle. Rotary connector 188 is connected to the rear of a motor vehicle in a conventional manner. Pivoting member 163 and 164 are connected through connecting links 157 and 158 which are pivotally attached to the pivoting members with pins 181, 182, 183 and 184, thereby providing 1° of rotational freedom of the connecting links about parallel axes 171, 172, 173 and 174 respectively. Connecting links 155 and 156 connect pivoting members 161 and 162 in the same manner as connecting links 157 and 158 connect pivoting members 163 and 164.

The axes of rotation 171 and 172 are further apart than axes 173 and 174, but the distance between axes 171 and 172 is equal to the distance between axes 173 and 174. It can be noted that the axes of rotation of connecting links 155 and 156 in pivoting members 161 and 162 are not parallel to the axes of rotation of connecting links 157 and 158 in their respective pivoting members. Axes of rotation 153 and 151 are further apart than axes of rotation 152 and 154, however, the distance between axes 151 and 152 is equal to the distance between axes 153 and 154. The design of this connecting device 199 causes small amounts of rotation of a trailer about a motor vehicle, when the trailer is essentially directly behind the motor vehicle, to be about axes which come close to or intersect the center of gravity of the motor vehicle.

Figure 12:
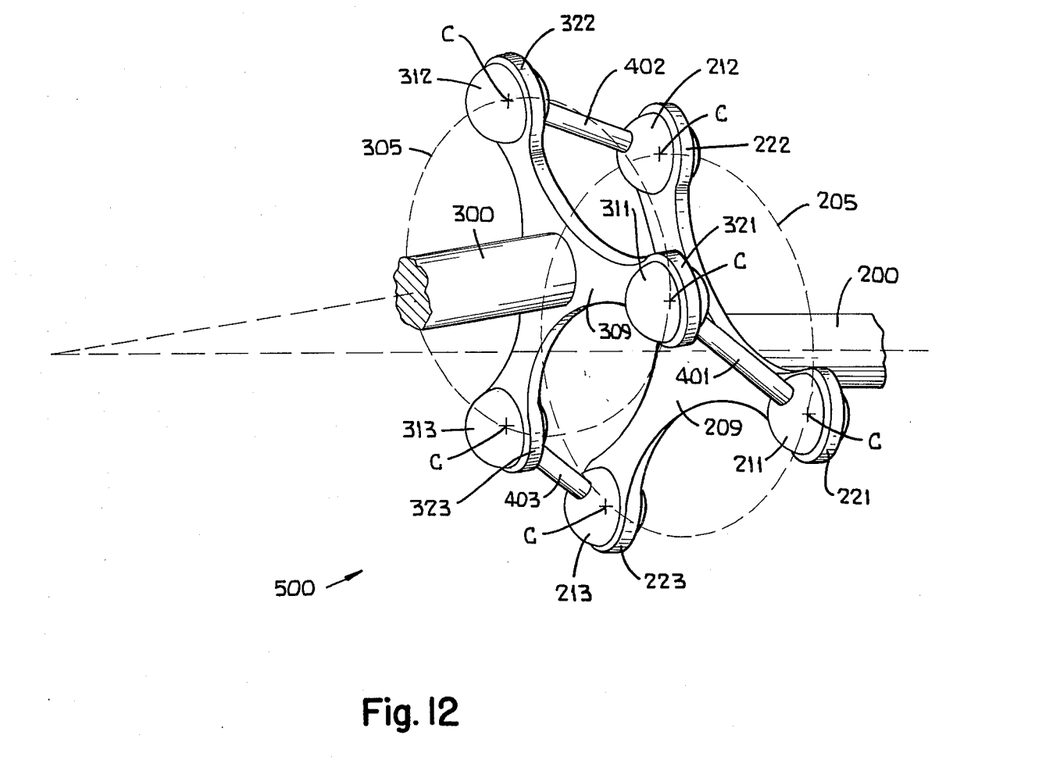
FIG. 12 is a perspective view of another connecting device which can be used in place of other connecting devices of the invention.

Referring to FIG. 12 there is illustrated a connecting device 399 which has an bar 300 which connects to a first vehicle in a conventional manner, the first vehicle typically being a car having four wheels and front wheel steering and the bar 300 attaching to a point near the rear of the motor vehicle for convenience. A bar 200 connects to a second vehicle, which may be a two or four wheeled trailer or any other vehicle. Thus the connecting device may be used in place of other connecting devices of the invention.

Bar 200 connects to a three-armed plate 209 which has, at the end of its three arms, ring sockets 221, 222 and 223 which encompass balls 211, 212 and 213 respectively, each of said balls having a center C. Similarly, bar 300 connects to a three-armed plate 309 having three arms which terminate in ring sockets 321, 322 and 323 which encompass balls 311, 312 and 313 respectively, each of said balls having a center C. Balls 211, 212 and 213 connect to balls 311, 312 and 313 through connecting arms 401, 402 and 403 in pairs respectively. The arms of three-armed plate 209 are slightly longer than the arms of three-armed plate 309 and therefore the centers of balls 211, 212 and 213 define a circle which is larger than the circle defined by the centers of balls 311, 312 and 313. The ball and socket joints of the connecting device 500 have 3° of rotational freedom, thus a rotary joint is not necessary in connecting the connecting device to the vehicles. However, the ball and socket joints could be replaced with gimbal type joints providing 2° of rotational freedom, thus necessitating the use of a rotary joint to accommodate rolling of the second vehicle with respect to the first.

While there have been described above the principles of this invention in connection with specific apparatus, it is to be clearly understood that this description is made only by way of example and not as a limitation to the scope of the invention.

What is claimed is:

1. A device which is for connecting a second vehicle to a first vehicle and which comprises:
   a. a second vehicle;
   b. connecting means for rotatably connecting said second vehicle to a first vehicle which connecting means includes means for causing at least a portion of rotational movement between a first vehicle and said second vehicle to be about an axis which does not intersect said connecting means; and
   c. said connecting means including:
      1. first and second pivot means each for allowing pivoting of a first element with respect to a second element, each of said first and second pivot means having only 1° of rotational freedom;
      2. first maintaining means for maintaining the axes of rotation of said first and second pivot means parallel and not collinear;
      3. means for connection of each of said first elements of said first and second pivot means to a first vehicle;
      4. third and fourth pivot means each for allowintg pivoting of a first element with respect to a second element, each of said third and fourth pivot means having only 1° of rotational freedom;
      5. second maintaining means for maintaining the axes of rotation of said third and fourth pivot means parallel, not collinear, and at a different distance apart than said first and second pivot means;
      6. means for connecting each of said first elements of said third and fourth pivot means to said second vehicle;
      7. said second element of said first pivot means connecting to or being integral with said second element of said third pivot means and said second element of said second pivot means connecting to or being integral with said second element of said fourth pivot means;
   d. said means for connection to a first vehicle including;
      1. fifth and sixth pivot means for allowing pivoting of a first element with respect to a second element, each of said fifth and sixth pivot means having only 1° of rotational freedom;
      2. means for maintaining the axes of rotation of said fifth and sixth pivot means parallel and not collinear;
      3. means for connection of each of said first elements of said fifth and sixth pivot means to a first vehicle;
      4. seventh and eighth pivot means for allowing pivoting of a first element with respect to a second element, each of said seventh and eighth pivot means havig only 1° of rotational freedom;
      5. means for maintaining the axes of rotation of said seventh and eighth pivot means parallel, not collinear, and at a different distance apart than said fifth and sixth pivot means, each of said first elements of said seventh and eighth pivot means being connected to said first elements of said first and second pivot means;
      6. said second element of said fifth pivot means connecting to or being integral with said second element of said seventh pivot means and said second element of said sixth pivot means connecting to or being integral with said second element of said eighth pivot means.

2. The device of claim 1 in which the distance between the axes of rotation of said fifth and seventh pivot means is equal to the distance between the said axes or rotation of the sixth and eighth pivot means.

3. The device of claim 1 in which the axes of rotation of said first and second, pivot means are oriented such that a line perpendicular to both of the axes of said first and second pivot means will be parallel to the axes of said seventh and eighth pivot means.

4. The device of claim 1 which includes;
   a. means maintaining the axes of rotation of said first, second, third and fourth pivot means parallel;
   b. means maintaining the axes of rotation of said fifth, sixth, seventh and eighth pivot means parallel;
   c. a rotary joint providing only 1° of rotational freedom;
   d. means connecting said second means for maintaining to one side of said rotary joint; and
   e. means connecting said second vehicle to the other side of said rotary joint.

5. A device which is for connecting a second vehicle to a first vehicle and which comprises:
   a. a second vehicle;
   b. connecting means for rotatably connecting said second vehicle to a first vehicle which connecting means includes means for causing at least a portion of rotational movement between a first vehicle and said second vehicle to be about a vertical axis which does not intersect said connecting means; and
   c. said connecting means including:
      1. first and second pivot means each for allowing pivoting of a first element with respect to a second element, each of said first and second pivot means having only 1° of rotational freedom;

2. first maintaining means for maintaining the axes of rotaion of said first and second pivot means parallel and not collinear;
3. means for connection of each of said first elements of said first and second pivot means to a first vehicle;
4. third and fourth pivot means each for allowing pivoting of a first element with respect to a second element, each of said third and fourth pivot means having only 1° of rotational freedom.
5. second maintaining means for maintaining the axes of rotation of said third and fourth pivot means parallel, not collinear, and at a different distance apart than said first and second pivot means;
6. means for connecting each of said first elements of said third and fourth pivot means to said second vehicle;
7. said second element of said first pivot means connecting to or being integral with said second element of said third pivot means and said second element of said second pivot means connecting to or being integral with said second element of said fourth pivot means; and
d. said connecting means also including a further pivot means allowing for rolling of said second vehicle with respect to said second maintaining means.

6. The device of claim 5 in which said further pivot means allowing for rolling includes:
1. a rotary joint providing only 1° of rotational freedom;
2. means connecting said second means for maintaining to one side of said rotary joint and
3. means connecting said second vehicle to the other side of said rotary joint.

7. The device of claim 6 in which said rotary joint has an axis of rotation parallel to the longitudinal axis of said second vehicle.

8. The device of claim 5 in which said second element of said first pivot means connects to said second element of said third pivot means through first and second connecting pieces which each pivotally attach with only 1° of freedom to each of said second elements of said first and third pivot means, the axes of rotation in said second elements of said first and third pivot means being parallel, not collinear and a different distance apart in one of said second elements of said first and third pivot means than in the other of said second elements of said first and third pivot means, and said second element of said second pivot means connects to said second element of said fourth pivot means through third and fourth connecting pieces which each pivotally attach with only 1° of freedom to each of said second elements of said second and fourth pivot means, the axes of rotation in said second elements of said second and fourth pivot means being parallel, not collinear and a different distance apart in one of said second elements of said second and fourth pivot means than in the other of said second elements of said second and fourth pivot means.

9. The combination comprising:
a. a motor vehicle;
b. a second vehicle;
c. connecting means for rotatably connecting said second vehicle to said motor vehicle which connecting means includes:
1. means for causing at least a portion of rotational movement between said motor vehicle and said second vehicle to be about a first axis which does not intersect said connecting means;
2. means for causing at least a portion of rotational movement between said motor vehicle and said second vehicle to be about a second axis which does not intersect said connecting means and which is perpendicular to said first axis;
3. means for causing at least a portion of rotational movement between said motor vehicle and said second vehicle to be about a third axis which intersects said connecting means, and which is parallel to said first axis; and
4. said connecting means including:
a. a rotary joint providing only 1° of rotational freedom;
b. means connecting one side of said rotary joit to said motor vehicle nd the other side of said rotary joint to said second vehicle and
c. the axis of rotation for said rotary joint being aligned parallel to the longitudinal axis of said motor vehicle and said second vehicle when such vehicles are in longitudinal alignment one with the other.

10. The combination comprising:
a. a motor vehicle;
b. a second vehicle;
c. connecting means for rotatably connecting said second vehicle to said motor vehicle which connecting means includes:
1. means for causing at least a portion of pitch rotational movement between said motor vehicle and said second vehicle to be about a lateral axis which does not intersect said connecting means, but comes close to or intersects the center of mass of said motor vehicle;
2. means for causing at least a portion of yaw rotational movement between said motor vehicle and said second vehicle to be about a first vertical axis which does not intersect said connecting means but comes close to or intersects the center of mass of said motor vehicle;
3. said connecting means including means for causing at least a portion of yaw rotational movement between said motor vehicle and said second vehicle to be about a second vertical axis which comes close to or intersects said connecting means, and which is parallel to said first vertical axis; and
4. said connecting means including means for allowing rolling of said second vehicle with respect to said first vehicle, said means for allowing rolling including:
a. a rotary joint providing only 1° of rotational freedom, and
b. means for connecting said second vehicle to one side of said rotary joint and for maintaining alignment of said rotary joint with its axis of rotation parallel to the longitudinal axis of said second vehicle.

* * * * *